United States Patent [19]
Endersz

[11] Patent Number: 5,633,485
[45] Date of Patent: May 27, 1997

[54] ARRANGEMENT WITH A CARD FOR VALUE TRANSACTIONS

[75] Inventor: Gyorgy Endersz, Bergtorpstigen, Sweden

[73] Assignee: Telia AB, Farsta, Sweden

[21] Appl. No.: 571,975

[22] PCT Filed: Jun. 9, 1994

[86] PCT No.: PCT/SE94/00559

§ 371 Date: Mar. 22, 1996

§ 102(e) Date: Mar. 22, 1996

[87] PCT Pub. No.: WO95/02870

PCT Pub. Date: Jan. 26, 1995

[30] Foreign Application Priority Data

Jul. 14, 1993 [SE] Sweden ............................ 9302415

[51] Int. Cl.$^6$ ............................................. G06K 5/00
[52] U.S. Cl. ................... 235/380; 235/379; 235/487; 235/492
[58] Field of Search ................... 235/379, 380, 235/487, 492

[56] References Cited

U.S. PATENT DOCUMENTS

| | | | |
|---|---|---|---|
| 4,277,837 | 7/1981 | Stuckert | 275/379 |
| 4,634,845 | 1/1987 | Hale et al. | |

FOREIGN PATENT DOCUMENTS 0302453  8/1989  European Pat. Off. .

*Primary Examiner*—Harold Pitts
*Attorney, Agent, or Firm*—Oblon, Spivak, McClelland, Maier & Neustadt, P.C.

[57] ABSTRACT

On initiation of a value transaction, a card can be utilized which can be read by a card-reading equipment which provides information and/or means or cash in dependence on the initiation. An adapter can be applied or allocated to the card, which adapter is applicable in the card-reading equipment in a corresponding manner to the card. The adapter is arranged to provide an indication of whether or not the card-reading equipment is authentic and/or has the authority to service the card in question.

20 Claims, 1 Drawing Sheet

ARRANGEMENT WITH A CARD FOR VALUE TRANSACTIONS

BACKGROUND OF THE INVENTION

1. Field of the Invention

The present invention relates to an arrangement with a card which can be used in initiating a value transaction and which can be read in card-reading equipment which provides information and/or means in dependence on the initiation.

2. Discussion of the Background

Such cards are well known per se and are utilized in connection with paying for goods and services. The cards can also be used in cash-dispensing equipment of the Bankomat, Minuten, etc. type. The cards occur as payment cards in various connections and can also constitute petrol cards, food-stuff cards and so forth. The card can be provided with intelligence to a greater or lesser extent. When the card is used, the card is identified by the card-reading equipment which, depending on whether the card is acceptable, supplies information, provides means, confirms transactions and so forth. Such cards and card-reading equipment are already well known and occur in large numbers on the market.

The card-reading equipment always verifies whether the card can be accepted for a transaction or not. In contrast, there is normally no corresponding control on the part of the card as to whether the card-reading equipment is acceptable on the part of the card owner. It is important to be able to provide equipment which makes such an authenticity check possible on the part of the card. In such a check it is also important that the card equipment does not retain the card for it to be utilized in an improper way.

SUMMARY OF THE INVENTION

It is the object of the invention to solve these problems, among others.

That which can mainly be considered to be characterizing of an arrangement according to the invention is that an adapter can be applied or allocated to the card, which adapter, in turn, can be applied in a corresponding manner to the card in the card-reading equipment. A further characteristic is that the adapter is arranged to provide an indication of the authenticity of the card-reading equipment and of its authority to service the card in question. In further developments of the concept of the invention, the adapter carries a slot for receiving the card and a plate-shaped part for enabling the adapter to be inserted into the slot of the card-reading equipment with the received card. The inbuilt intelligence of the card, that is to say the circuits, microprocessor and so forth which exert this intelligence, can participate wholly or partially in a procedure determining the authenticity or authority of the card-reading equipment. Alternatively or as a supplementary measure, the adapter can comprise circuits and elements exercising intelligence. The adapter also comprises energy-supplying and indicating elements. The adapter can thus comprise microprocessor elements with associated space. In one embodiment, the adapter is designed in such a manner that the determination of authenticity and authority can be done by means of the adapter alone, that is to say the card does not need to be placed in the adapter. In this case, the adapter thus does not need to include any card-receiving element either, for example in the form of slots or the like.

In a preferred embodiment, the adapter is designed to be flexible, which means that, in principle, it can be carried by a card user.

ADVANTAGES

That which has been proposed above provides a simple possibility for each card user to check whether the particular terminal in which the card is to be used is authentic or not. The card can thus be protected against improper sequestration or utilization of information on the card or other information such as, for example, the PIN code which is provided by the card owner to the card reader/terminal. The present card embodiments can also be retained for the said authentication or determination of authority. The card does not need to be designed with its own indicating elements or own battery supply, which considerably complicate the card construction.

BRIEF DESCRIPTION OF THE DRAWINGS

A presently proposed embodiment of an arrangement which exhibited significant characterizing features of the invention will be described below, at the same time referring to the attached drawings, in which.

DETAILED DESCRIPTION OF A PREFERRED EMBODIMENT

Figure 1:
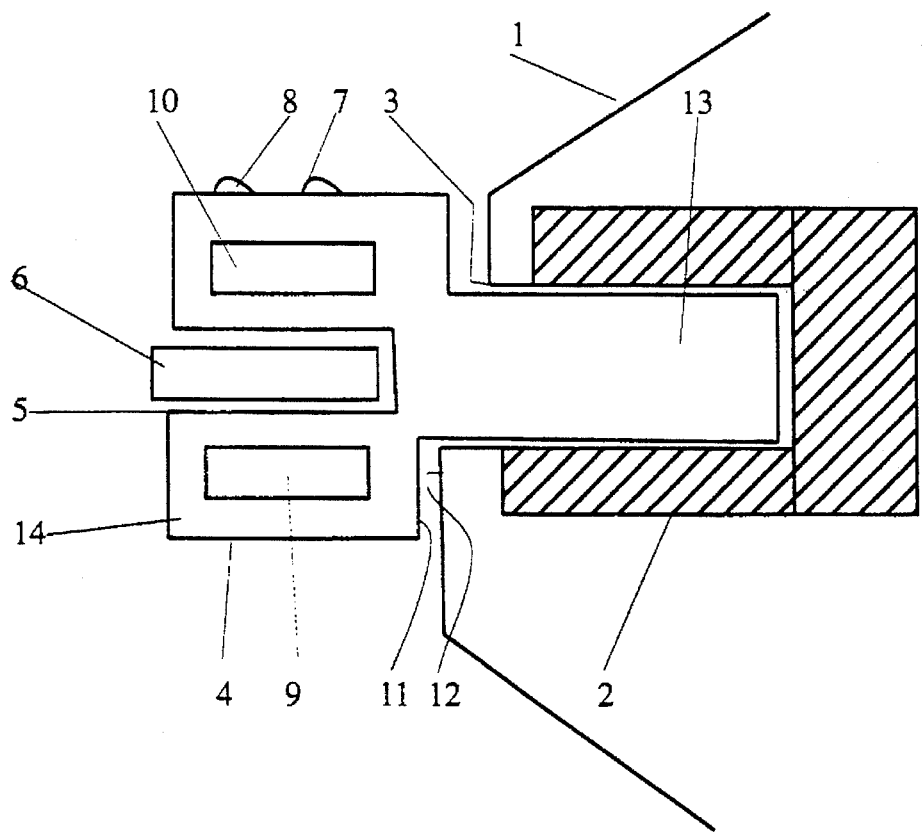
FIG. 1 shows in side view and in principle an adapter into which a conventional card is inserted and where the adapter, in turn, is inserted into a slot in a card-reading equipment.

In FIG. 1, a terminal, for example an automatic cash dispenser, is specified by 1. The terminal comprises in a manner known per sea card-reading equipment 2 with a slot 3 for receiving an appropriate card. Since the card-reading function is well known per se, it will not be described in further detail here.

In the slot 3, an adapter 4 is inserted which, in turn, is provided with a slot 5 for a conventional card 6, for example of the Bankomat card type. The adapter includes indicating elements in the form of light-emitting elements 7 and 8. A power supply element 9 is also included. In the present case, the adapter also includes circuits 10 which can include a microprocessor with associated memory elements. When the adapter assumes its inserted position in the slot 3, an authentication and/or authority procedure is carried out on the part of the adapter with respect to the card-reading equipment. In this procedure, the adapter determines if the terminal 1 has relevant authentication or authority. This determination process can be carried out in a manner known per se by means known per se. If the terminal 1 is authentic, the element 7, which can consist, for example, of a green light, is initiated or lit. If this said approval on the part of the adapter is not present, a red light 8 can be lit. This provides the card user with an indication of whether he or she should continue to use the terminal or not.

The proposed equipment can also be designed in such a manner that it utilizes any intelligence present in the card 6 in the said determination procedure. This can also be done in a manner known per se and with known means.

Figure 2:
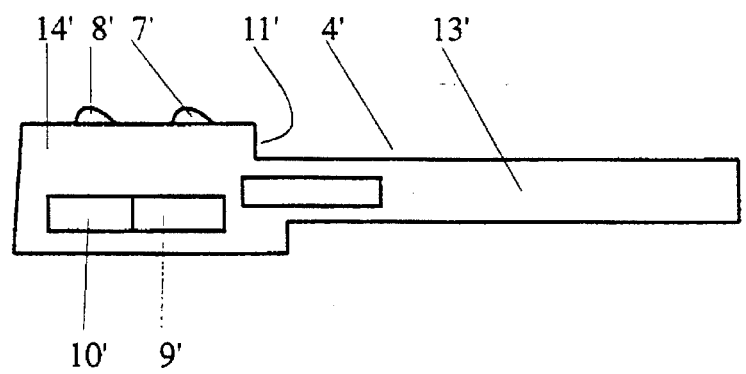
FIG. 2 shows in side view a flexible embodiment without a card which contains its own intelligence for determining authority, and indicating and power-supplying elements.

FIG. 2 shows an embodiment in which the adapter itself lacks a slot for receiving an appropriate card. The adapter is inserted in corresponding manner into the slot 3 as the adapter 4 in FIG. 1. In the embodiment according to FIG. 2, the adapter 4' includes indicating elements 7' and, respectively, 8' in corresponding manner. A power-supplying circuit 9' is also included which can comprise a battery arrangement of a type known per se. Furthermore, a microprocessor 10' with associated memory space is included.

The above-mentioned adapters are preferably designed in such a manner that they cannot be drawn into the card-reading equipment 2 and retained by it. In the illustrative embodiment, the adapter according to FIG. 1 therefore exhibits stop surfaces 11 which can interact with corresponding surfaces 12 on the terminal 1. The said stop surfaces limit the degree to which the adapter can be drawn into the slot. The adapter according to FIG. 2 has in a corresponding manner a stop surface 11' which can interact with the said stop surface 12 on the terminal.

In the illustrative embodiment according to FIG. 1, a respective adapter thus exhibits a plate-shaped part 13 or, respectively, 13' by means of which the adapter can be inserted into the slot 3. The adapter also comprises a part 14 and respectively 14' which is widened in relation to the plate-shaped part.

In the adapter or card, possibly also in the card reader (terminal), information and/or software is required for checking the card reader (terminal). For example, the adapter includes this for:
its own identity
communication with the card
communication with the reader In certain systems, there is no procedure for identifying the terminal/reader such as, for example, Bankomat with magnetic strip cards or systems with cards which have low intelligence. In this case, the terminal is supplemented with software for identifying it to the adapter. The invention is not limited to the embodiment shown in the above by way of example but is subject to modifications within the scope of the subsequent patent claims and concept of the invention.

I claim:

1. Arrangement with a card which can be used in initiating a value transaction and which can be read in card-reading equipment which provides information and/or cash in dependence on the initiation, and an adapter can be applied or allocated to the card, which adapter can be applied in a corresponding manner to the card in the card-reading equipment, and in that the adapter is arranged to provide an indication of whether or not the card-reading equipment is authentic and has the authority to service the card in question, characterized in that the adapter includes circuits operating with intelligence which wholly or partially participate in an authentication- or authority-determining procedure with respect to the cardreading equipment, the adapter is arranged so that it cannot be swallowed by the card-reading equipment or the terminal including the letter, the adapter comprises first stop surfaces which can interact with corresponding second stop surfaces on the terminal with the aim of making it impossible for the adapter to be drawn into the card-reading equipment and to be retained by the same.

2. Arrangement according to claim 1, characterized in that the adapter carries a slot for receiving the card and a plate-shaped part for enabling the adapter to be inserted into the slot of the card-reading equipment with a received or inserted card.

3. Arrangement according to claim 1, characterized in that circuits or elements operating with an intelligence in the card wholly or partially participate in an authenticity check or authority-determining procedure with respect to the card-reading equipment.

4. Arrangement according to claim 2, characterized in that circuits or elements operating with an intelligence in the card wholly or partially participate in an authenticity check or authority-determining procedure with respect to the card-reading equipment.

5. Arrangement according to claim 1, characterized in that the adapter includes power-supplying and indicating elements.

6. Arrangement according to claim 2, characterized in that the adapter includes power-supplying and indicating elements.

7. Arrangement according to claim 3, characterized in that the adapter includes power-supplying and indicating elements.

8. Arrangement according to claim 4, characterized in that the adapter includes power-supplying and indicating elements.

9. Arrangement according to claim 1, characterized in that the adapter includes a microprocessor with associated memory.

10. Arrangement according to claim 2, characterized in that the adapter includes a microprocessor with associated memory.

11. Arrangement according to claim 3, characterized in that the adapter includes a microprocessor with associated memory.

12. Arrangement according to claim 4, characterized in that the adapter includes a microprocessor with associated memory.

13. Arrangement according to claim 1, characterized in that the card has a flexible construction which entails that it can be carried by the card owner.

14. Arrangement according to claim 2, characterized in that the card has a flexible construction which entails that it can be carried by the card owner.

15. Arrangement according to claim 3, characterized in that the card has a flexible construction which entails that it can be carried by the card owner.

16. Arrangement according to claim 4, characterized in that the card has a flexible construction which entails that it can be carried by the card owner.

17. Arrangement according to claim 1, characterized in that the adapter includes a plate-shaped part and a part which is widened in relation to the latter.

18. Arrangement according to claim 2, characterized in that the adapter includes a plate-shaped part and a part which is widened in relation to the latter.

19. Arrangement according to claim 3, characterized in that the adapter includes a plate-shaped part and a part which is widened in relation to the latter.

20. Arrangement according to claim 4, characterized in that the adapter includes a plate-shaped part and a part which is widened in relation to the latter.

* * * * *